United States Patent

[11] 3,532,167

| [72] | Inventors | Harold C. Noe, Jr.; |
| | | James R. Stanford, Houston, Texas |
| [21] | Appl. No. | 783,140 |
| [22] | Filed | Dec. 11, 1968 |
| [45] | Patented | Oct. 6, 1970 |
| [73] | Assignee | Nalco Chemical Company |
| | | Chicago, Illinois |
| | | a corporation of Delaware |

[54] WATERFLOOD PROCESS
4 Claims, No Drawings

[52] U.S. Cl. .................................................. 166/275
[51] Int. Cl. .................................................. E21b 43/22
[50] Field of Search ........................................ 166/275, 274, 273, 305–307; 252/8.55(D), 8.55(B), 8.55(C); 260/502.5; 210/38

[56] References Cited

UNITED STATES PATENTS

| 2,777,818 | 1/1957 | Gambill .................. | 252/8.55 |
| 2,965,665 | 12/1960 | Gaertner et al. ........... | 252/8.55 |
| 3,234,124 | 2/1966 | Irani ..................... | 210/38 |
| 3,271,306 | 9/1966 | Capriati et al. ........... | 252/8.55 |
| 3,288,846 | 11/1966 | Irani et al. ................ | 260/500 |
| 3,385,675 | 5/1968 | Fiedelman ................. | 260/502.5X |
| 3,434,969 | 3/1969 | Ralston ................... | 260/502.5X |

*Primary Examiner*—Stephen J. Novosad
*Attorney*—Johnston, Root, O'Keefe, Keil, Thompson and Shurteff

ABSTRACT: Aminoalkylene phosphonic acids and water soluble salts thereof are introduced into one or more water injection wells and forced through the underground formation to a producing well or wells without being destroyed during such passage.

WATERFLOOD PROCESS

This invention relates to a method of treating water introduced into underground formations, and more particularly to a method of treating water which is forced into the producing formation in the secondary recovery of oil or in the disposal of waste water and brines from oil and gas wells.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the waterflooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well and the water is pumped into the injection well. Supplementary water from other sources may also be used in conjunction with the produced water. When the storage reservoir is open to the atmosphere and the oil is subject to aeration, this type of waterflooding system is referred to herein as an "open waterflooding system". If the water is recirculated in a closed system without substantial aeration, the secondary recovery method is referred to herein as a "closed waterflooding system".

The water which is introduced into the injection wells may vary considerably in composition from one field to another. Frequently it contains relatively large quantities of dissolved salts such as sodium chloride and therefore can be described as a brine. It may also contain other salts such as those of calcium, magnesium, barium and strontium. Some iron salts may likewise be present. In some cases these salts are added to a fresh water to prevent clay minerals from swelling and sealing off porous oil sands, but in most instances their occurrence is natural.

Some of the difficulties heretofore encountered in waterflooding operations are the plugging of surface equipment, injection wells and formation due to numerous factors but particularly because of the formation of insoluble salts in the system and on the face of the formation, the growth of microorganisms which form solids that tend to plug the equipment and formation and the corrosion of equipment used in the system with the attendant formation of products of corrosion which tend to plug the formation. The plugging of the formation makes it necessary to use increased pressures in order to force the water into the injection wells and this in turn greatly increases the cost of secondary oil recovery operations by waterflooding methods, making such methods impractical in many instances. The corrosion problem also makes it necessary to replace the equipment at frequent intervals thereby increasing the cost of the secondary oil recovery operation.

Inorganic polyphosphates have been added to water in waterflood systems in an effort to alleviate corrosion and scale formation.

The polyphosphates suffer from the objection that under the conditions present in an oil-bearing formation they can undergo reversion to orthophosphates which in turn form insoluble salts with calcium, magnesium, barium and strontium. Calcium and magnesium are usually present in substantial amounts in oil-bearing formations and barium and strontium salts are often present in smaller amounts. The formation of insoluble salts as previously indicated would tend to plug the oil-bearing strata and reduce the chances of obtaining an improvement in the recovery of the oil.

It would be desirable to provide a process in which a chemical is added to an injection well which will inhibit scaling of equipment and plugging of the well and will retain its identity while passing through the underground formation to the producing well or wells where it is also effective as a scale inhibitor.

In accordance with the invention it has been found that certain aminoalkylene phosphonic acids and salts thereof which are effective as scale inhibitors can be added to an injection well or wells in a waterflood system and will pass through the underground formation to a producing well or wells without being destroyed during such passage. Thus, protection is afforded against scale formation in the producing well or wells as well as the injection well or wells. This protection is especially useful in a number of areas where scaling of metal surfaces, particularly ferrous metal surfaces, by barium sulfate, calcium sulfate and/or calcium carbonate is a problem. By control of scale formation, breakdowns, maintenance, cleaning and repairs caused or necessitated by scale formation can be minimized.

The aminoalkylenephosphonic acids and salts useful for this invention can be characterized as containing at least one N-C-P linkage in their molecules, and as having the formula

I.

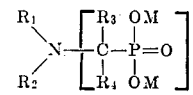

where $R_1$ and $R_2$ can be hydrogen, an alkyl radical containing 1 to 6 carbon atoms, cyclohexyl, a radical $-(C_nH_{2n}O)_xH$ where $n$ is 2 to 4 and $x$ is 1 to 3, or alkylene phosphonic acid radicals

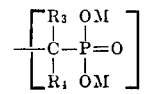

$R_3$ and $R_4$ are hydrogen or lower alkyl containing 1 to 4 carbon atoms, and M is hydrogen or $-NH_4$ or alkali metal or an amine salt group of a water soluble amine.

Most of these compounds can be prepared by the methods described in U.S. Pat. Nos. 3,234,124 and 3,288,846, the disclosures of which are incorporated by reference. In general, the aminoalkylene phosphonic acids are prepared by reacting ammonia or a primary or secondary amine with an aldehyde or ketone and orthophosphorus acid having the formula

II.

Preferred compounds for use in practicing the invention are aminotri-(methylene phosphonic) acid and its sodium salts, e.g., the pentasodium salt. Mixtures of aminomono-, aminodi- and aminotri-(methylene phosphonic) acid and water soluble salts thereof can be used. The aminomono- and aminodi- derivatives can be oxyalkylated with ethylene oxide and/or 1,2-propylene oxide and/or 1,2-butylene oxide.

The aminoalkylene phosphonic acids can be converted to a salt by partial to complete neutralization with an alkaline substance such as, for example, potassium or sodium hydroxide, potassium or sodium carbonate, ammonia, or a basic amino compound, e.g., tetramethyl ammonium hydroxide, methylamine, ethylamine, diethylamine, triethanolamine, diethanolamine, triethylamine, ethylene diamine, diethylene triamine, pyridine, morpholine or other amine. The amine should be a water soluble amine or at least one that does not destroy solubility in water.

The invention is further illustrated by the following examples in which the quantities are stated in parts by weight unless otherwise indicated.

EXAMPLE I

Aminotri-(methyl phosphonate) is injected into the water of an injection well in a quantity of ten parts per million parts of water in a West Texas oil field where an injection well is spaced about 200 to 300 yards from each of four producing wells. The floodwater is forced from the injection well to the producing wells. The scale inhibiting aminotri-(methyl phosphonate) is carried along under ground to the producing wells and affords protection to the equipment in the injection well and the producing wells while also inhibiting underground plugging.

EXAMPLE II

The procedure is the same as in Example I except that the pentasodium aminotri-(methyl phosphonate) is used.

In a similar manner any of the compounds coming within the scope of Formula I can be used.

The arrangement of injection and producing wells can be varied. Thus, a line drive arrangement can be used, or a single injection well and either six or eight surrounding producing wells can be used, or a plurality of injection wells can be used around one or more producing wells.

The dosage of the aminoalkylene phosphonic acids and/or water soluble salts thereof should be sufficient to give a scale inhibiting amount in the producing well of at least 0.5 part per million (ppm). Normally the amount added to the water in the injection well will be at least 10 ppm but in some cases up to 100 ppm and even as high as 200 to 500 ppm can be used.

The present invention is based on the discovery that certain types of chemical compounds as described herein which are effective as scale inhibitors can be forced through an underground formation from an injection well to at least one producing well. Many other types of compounds do not have this property and will be adsorbed by the formation.

We claim:

1. In a waterflood system in which water is added to one or more injection wells in order to force oil from an underground formation to one or more producing wells, the process which comprises introducing a scale inhibiting compound having the following formula:

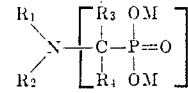

where $R_1$ and $R_2$ can be hydrogen, an alkyl radical containing 1 to 6 carbon atoms, cyclohexyl, a radical $-(C_nH_{2n}O)_xH$ where $n$ is 2 to 4 and $x$ is 1 to 3, or alkylene phosphonic acid radicals

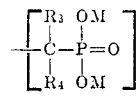

$R_3$ and $R_4$ are hydrogen or lower alkyl containing 1 to 4 carbon atoms, and M is hydrogen or $-NH_4$ or alkali metal or an amine salt group of a water soluble amine, into at least one injection well and forcing a scale inhibiting amount of at least 0.5 parts per million of said compound through said underground formation to at least one producing well.

2. A process as claimed in claim 1 in which said scale inhibiting compound is injected into said injection well in a dosage of at least 10 parts per million parts of water injected into said well.

3. A process as claimed in claim 1 in which said scale inhibiting compound is aminotri-(methyl phosphonate).

4. A process as claimed in claim 1 in which said scale inhibiting compound is pentasodium aminotri-(methyl phosphonate).